United States Patent
Bhadra

(10) Patent No.: US 10,362,113 B2
(45) Date of Patent: Jul. 23, 2019

(54) COGNITIVE INTELLIGENCE PLATFORM FOR DISTRIBUTED M2M/ IOT SYSTEMS

(71) Applicant: Prasenjit Bhadra, Jersey City, NJ (US)

(72) Inventor: Prasenjit Bhadra, Jersey City, NJ (US)

( * ) Notice: Subject to any disclaimer, the term of this patent is extended or adjusted under 35 U.S.C. 154(b) by 0 days.

(21) Appl. No.: 14/790,655

(22) Filed: Jul. 2, 2015

(65) Prior Publication Data

US 2017/0006141 A1    Jan. 5, 2017

(51) Int. Cl.
   *G06F 15/16*      (2006.01)
   *H04L 29/08*      (2006.01)
      (Continued)

(52) U.S. Cl.
   CPC ............... *H04L 67/12* (2013.01); *H04W 4/70* (2018.02); *H04W 84/18* (2013.01)

(58) Field of Classification Search
   CPC ....... H04L 67/12; H04L 67/125; H04L 67/04; H04L 12/2803; H04L 41/08; H04L 43/065; H04W 84/18; H04W 4/005
      (Continued)

(56) References Cited

U.S. PATENT DOCUMENTS 6,449,650 B1 *   9/2002   Westfall .............. H04L 12/5601
                                               709/227
6,456,624 B1 *   9/2002   Eccles ..................... H04L 49/25
                                               370/360
(Continued)

FOREIGN PATENT DOCUMENTS

EP        2208136 A4    12/2012
WO    2001093076 A2    12/2001
            (Continued)

OTHER PUBLICATIONS

Sheng-Tzong Cheng, Chi-Hsuan Wang and Ching-Chung Chen, An Adaptive Scenario Based Reasoning System Cross Smart Houses, IEEE 9th International Symposium on Communications and Information Technology ISCIT, Jun. 2009, pp. 549-554.

(Continued)

*Primary Examiner* — Oleg Survillo
(74) *Attorney, Agent, or Firm* — Chinta Perdomo Berks & Fratangelo LLP

(57) ABSTRACT

Systems and methods to leverage and manage data and knowledge in a M2M or Internet of Things (IoT) network are provided. More particularly, a cognitive intelligence platform for an IoT network that provides autonomic decision support system at or near real-time and executes a dynamic runtime is provided. The hardware, software and communication design of the platform replicates the structural and operational model of the human nervous system to achieve cognitive intelligence through adaptation, collaborative learning, knowledge sharing and self-adjustment. Further, in one embodiment, the cognitive intelligence platform has three logical processing layers of increasing complexity, each of which has agents that use statistical and machine learning techniques and algorithms to resolve situational needs and update knowledge. Furthermore, each processing layer of the platform has a basic level of intelligence and additionally the hierarchy of layers aggregates the learning and intelligence at each layer.

14 Claims, 7 Drawing Sheets

(51) Int. Cl.
*H04W 84/18* (2009.01)
*H04W 4/70* (2018.01)

(58) Field of Classification Search
USPC .......................................................... 709/217
See application file for complete search history.

(56) References Cited

U.S. PATENT DOCUMENTS

| | | | |
|---|---|---|---|
| 8,276,115 B2 | 9/2012 | Bates et al. | |
| 8,352,420 B2* | 1/2013 | Jung | H04W 4/02 707/609 |
| 8,555,273 B1* | 10/2013 | Chia | G06F 8/665 717/168 |
| 9,122,694 B1* | 9/2015 | Dukes | G06F 17/30336 |
| 2003/0002521 A1* | 1/2003 | Traversat | G06F 9/4416 370/465 |
| 2003/0199997 A1* | 10/2003 | Gao | G05B 5/01 700/18 |
| 2005/0256667 A1* | 11/2005 | Jung | G01D 21/00 702/122 |
| 2005/0267960 A1* | 12/2005 | Jung | H04L 67/125 709/223 |
| 2006/0149566 A1* | 7/2006 | Lin | G06Q 10/08 705/22 |
| 2007/0143390 A1* | 6/2007 | Giambalvo | G06F 8/61 709/200 |
| 2007/0162973 A1* | 7/2007 | Schneier | G06F 21/552 726/22 |
| 2008/0319812 A1 | 12/2008 | Sousa et al. | |
| 2009/0282156 A1* | 11/2009 | Jung | G01D 9/005 709/228 |
| 2010/0080235 A1* | 4/2010 | Yamate | H04L 45/00 370/395.31 |
| 2010/0185963 A1* | 7/2010 | Slik | G06F 17/30082 715/764 |
| 2011/0121654 A1* | 5/2011 | Recker | H02J 9/065 307/66 |
| 2013/0173926 A1 | 7/2013 | Morese et al. | |
| 2013/0188515 A1 | 7/2013 | Pinheiro et al. | |
| 2014/0005809 A1* | 1/2014 | Frei | H04L 29/1249 700/90 |
| 2014/0222522 A1 | 8/2014 | Chait | |
| 2014/0244834 A1 | 8/2014 | Guedalia et al. | |
| 2015/0081053 A1* | 3/2015 | Willig | H04L 67/125 700/90 |
| 2015/0237591 A1* | 8/2015 | Shukair | H04W 56/0045 370/329 |
| 2015/0293971 A1* | 10/2015 | Will | G06F 17/30466 707/718 |
| 2017/0201545 A1* | 7/2017 | Nicodemus | G06F 11/3495 |
| 2017/0249448 A1* | 8/2017 | Beckman | G06F 21/10 |

FOREIGN PATENT DOCUMENTS

| | | |
|---|---|---|
| WO | 2013123445 A1 | 8/2013 |
| WO | 2013131546 A1 | 9/2013 |
| WO | 2014128253 A1 | 8/2014 |
| WO | 2014130568 A1 | 8/2014 |
| WO | 2014182692 A1 | 11/2014 |

OTHER PUBLICATIONS

Shifeng Fang, Li Da Xu et al., an Integrated System for Regional Environmental Monitoring and Management Based on Internet of Things, IEEE Transactions on Industrial Informatics, May 2014, vol. 10, No. 2, pp. 1596-1605.

Kiev Gama, Lionel Touseau, Didier Donsez, Combining Heterogeneous Service Technologies for Building an Internet of Things Middleware, Journal of Computer Communications, France, Feb. 2012, vol. 35, Issue 4, pp. 405-417.

Theo Canter, Stefan Forsstrom et al., MediaSense—an Internet of Things Platform for Scalable and Decentralized Context Sharing and Control, ICDT: The Seventh International Conference on Digital Telecommunications, France, May 2012, pp. 27-32.

Artem Katasonov, Olena Kaykova et al., Smart Semantic Middleware for the Internet of Things, 5th International Conference on Informatics in Control, Automation and Robotics ICSO, Portugal, May 2008, pp. 169-178.

Dimitris Kelaidonis, Andrey Somov et al., Virtualization and Cognitive Management of Real World Objects in the Internet of Things, IEEE International Conference on Green Computing and Communications, Conference on Internet of Things, and Conference on Cyber, Physical and Social Computing, France, Nov. 2012, pp. 187-194.

Gustavo Fires, Mario Antunes et al., Architecture for Orchestration of M2M Services, 12th Conference on Computer Networks, Portugal, Nov. 2012, pp. 1-8.

Yi Xu, Sumi Helal, Scalable Cloud-Sensor Architecture for the Internet of Things, 2014 ACM Transcations.

Ying Li, Xu Dong, Lifeng Wang, Xiaobo Guo, Lin Bai, A Dual-Cycle Architecture in Cognitive M2M Wireless Networks, International Journal of Distributed Sensor Networks, vol. 2013 (2013), Article ID 239170, 10 pages.

H. I. Kaplan & B.J. Sadock, Synopsis of Psychiatry, 1991, 6th Ed., Baltimore: Williams & Wilkins.

* cited by examiner

| | | |
|---|---|---|
| 310 | Header | Event ID: unique identifier denotes each instance of the generated event |
| | | Parent ID: denotes source who produced the event |
| | | Timestamp: time interval in milliseconds to denote event generation time - if any |
| | | Event Sink: one or more node/service endpoints specified as destination |
| | | Time-to-Live: lifespan of the event – if any |
| 320 | Body | Group ID: denotes context/correlation with other events |
| | | Measurement Attributes: a series of name value pairs in the presenting identified properties, data readings enveloped within the event |
| | | Stream Contents: contents, team of byte/data or any unstructured information which are not processed by the service |
| | | Context Parameters: a collection of context specific properties beyond identified ones – if any |
| | | Action Logs: an audit trail of series of actions and outcomes within the lifetime of the event |
| | | Service Request: specific service request embedded by the source node/service agent – if any |

| 331 | 332 | 333 | 334 | 335 | 336 |
|---|---|---|---|---|---|
| Event ID | Knowledge IDs/ Decision vectors | Temporal/ Sequential/ Composite/ Simple | Source/ Producer Service | Dependent/ Parent Events | Action / Rule Map |

FIG. 3B

| 341 | 342 | 343 | 344 | 345 | 346 | 347 |
|---|---|---|---|---|---|---|
| Service ID | Action/ Rule Mapping | System/ Node ID | Service Agent ID | Parent Service ID | Mediation Rule ID | Last Updated On |

FIG. 3C

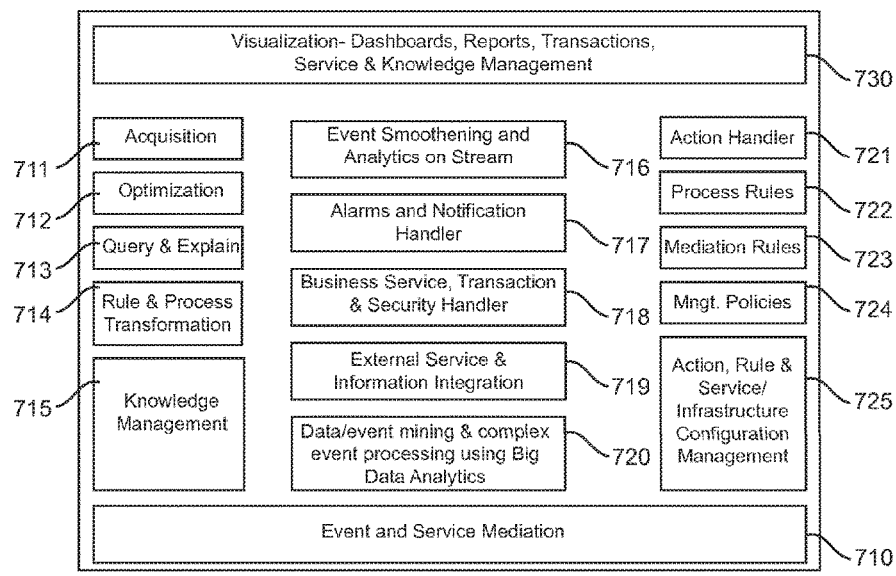
FIG. 7
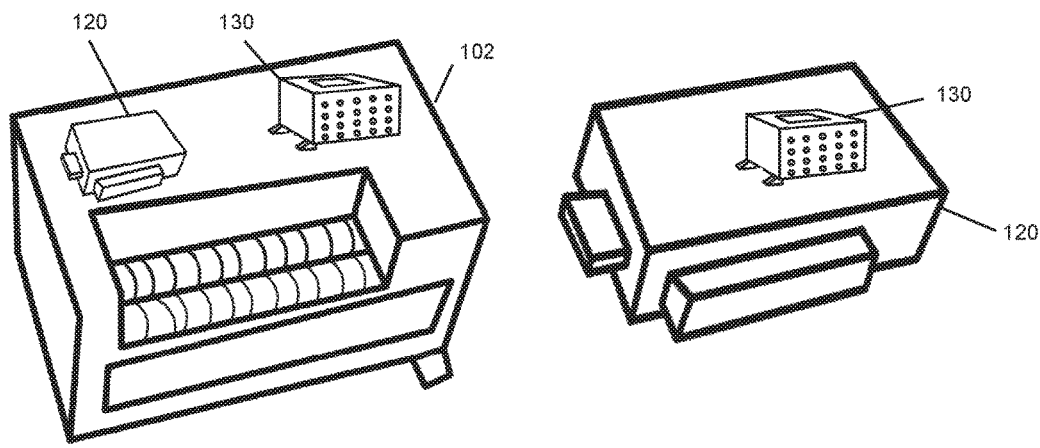
FIG. 8
Fig. 9

COGNITIVE INTELLIGENCE PLATFORM FOR DISTRIBUTED M2M/ IOT SYSTEMS

FIELD OF THE INVENTION

The present invention relates generally to intelligent wireless and wireless sensor network (WSN) communication design and distributed mobile, machine-to-machine (M2M), and internet of things (IoT) system architecture.

BACKGROUND

With the proliferation of wireless infrastructure, smart controllers, and smart devices, numerous industries are relying on distributed machine-to-machine (M2M) environments and internet of things (IoT) for improving operational efficiency. Existing M2M deployments require numerous controllers and heterogeneous hardware/communication interfaces to interface the M2M sensors to their respective central units to receive, process and transmit data. In any physical environment, the deployed M2M/IoT platform collects structured and unstructured data and a variety of related and unrelated perpetual events which are processed by one or more nodes depending on its physical and functional capabilities.

The controllers and interfacing M2M devices usually have pre-fed software that caters to specified situations and where the runtime operates on a fixed set of rules/logic within its boundary of operations. Due to the constraints of processing and communication capacity, any single node with preloaded structural intelligence will have limited scope to correlate and aggregate raw events, develop situational awareness and take prompt actions to manage the disruptive operational environment of a M2M/IoT ecosystem. These systems have limited ability to leverage machine intelligence and collaborative learning within a specified system boundary. The cognition process in these systems is generally confined to data mining and based on limited pre-fed intelligence.

The complexities and uncertainties of the operational environment, the sensory nodes and edge computing devices demand a uniform platform with distributed intelligence which collaborates and organizes the process of analyzing, processing, and routing of data, events and commands based on changing context, exceptions, and serviceability of the operational environment. In order to support uncertain operational chaos and disruptive process management in real-time or near-real-time, the system needs dynamic execution pattern rather than relying on a static state machine implemented within interconnected intelligent nodes.

Accordingly, there is a significant need for a cognitive intelligent system that will not only monitor and process data and take actions in each known system environment but incrementally learn from its actions as well as the knowledge gained by its peers and supervisors and apply acquired knowledge to continually adjust the system to adapt and execute in any dynamic environment. It is therefore an object of the present invention to treat the physical environment as a whole, optimize the collaboration pattern, and allow mutual sharing of learning to solve problems in real-time or near real-time.

SUMMARY OF THE INVENTION

The following presents a simplified summary relating to one or more aspects and/or embodiments disclosed herein. As such, the following summary should not be considered an extensive overview relating to all contemplated aspects and/or embodiments. Nor should the following summary be regarded to identify key elements relating to all contemplated aspects and/or embodiments or to delineate the scope associated with any particular aspect and/or embodiment.

According to one exemplary aspect, the disclosure relates to a cognitive intelligence platform for distributed M2M and IoT implementations that provides autonomic and real-time or near real-time decision support system. The cognitive intelligence platform has a unique hardware, software, and communication design that replicates the structural and operational model of a centralized nervous system or neural network of vertebrates, such as the human nervous system, through mutual adaptive collaborative learning, adaptive knowledge sharing, persisting and applying incremental knowledge contextually, and self-adjustment through mutual sharing of responsibilities. It is based on a dynamic run-time that has the ability to resolve the context of a changing physical and operational environment through collaborative operations which continue to mature over time. The system is able to self-adjust the entire ecosystem to adapt to changing conditions and serve real-time operational efficiency.

According to another exemplary aspect, the platform design designates operational capabilities, dependencies and hierarchies to process events, execute operations and deliver supports. The cognitive intelligence platform has three logical processing layers—edge controllers (EC), terminal aggregators (TA), and an intelligent service management hub (ISM or Hub). The edge controllers act as receptors for specific operations. They retrieve the raw events from the physical environment and broadcast them to peers and terminal aggregators to support context specific actions. The terminal aggregators supervise and support the operation control and knowledge distribution for edge controllers, and facilitate collaboration in or near real-time across the layers horizontally and vertically. They are connected to other TAs and ECs for information exchange. They are also connected to the ISM for exchange of commands and operational data. The Intelligent Service Management Hub monitors operations and uses complex statistical and machine learning techniques and algorithms to resolve situational needs and update rules for subsystems on the fly. The Hub may be deployed in one or more servers.

According to one aspect of the disclosure, the dynamic run-time behavior of the disclosed platform is accomplished in two steps—each node has a basic level of intelligence and rules to process content, data, events, and collaborate with other nodes. Additionally, the hierarchy of layers allows the platform to aggregate the learning at each level and adjust the responsibilities. The disclosed cognitive platform decouples the rules from the processors, the tasks from the workflow subroutines/agents, and delegates the processing of the intelligence into the logical layers to have autonomy in decision support and adapt changes automatically. The agents can reorganize themselves within the runtime environment to improve operational autonomy across the layers. The agents may move across the processing layers as needed depending on the capabilities of the agent and the requirements of the system. The movement or deployment of the agents is facilitated by the runtime to improve the real-time execution. The movement or deployment of the agents may be dynamic or manual. All the layers have uniform hardware and software architecture so that the system can distribute the agents, update rule engines, and translate the changing runtime semantics into a permanent operational environment. All nodes, including controllers, aggregators and ISM servers, are preloaded with minimum software (agents, rules engine, and event bus frameworks) and the ISM hosts a repository of agents. Within the connected environment, each agent sends real-time notifications to its peers and supervisor layers to seek support to handle exception conditions. The response from the supporting nodes is an immediate action and/or change in the processing rules or learning patterns to support the conditions as well as deploying any additional agents to act on those situations. The platform architecture supports the system to define the priority and order of such changes.

According to another aspect of the disclosure, the disclosed cognitive platform has a collaborative runtime environment where each node is a participant. This supports mutual learning and sharing and results in new knowledge for the system. This allows the system to assess, resolve and process the context and content dynamically and deliver adjusted actions and services in isolation and/or in collaboration with other nodes and provide real-time operational intelligence. Thus the distributed platform grows the knowledge of the platform and helps the system gain autonomy by enhancing situational awareness and decentralized decision-making abilities over time.

According to another aspect of the disclosure, the delegation of responsibility and dynamic organization allows the M2M/IoT implementations to scale horizontally and vertically without effecting existing implementation. The disclosed cognitive platform has multiple applications as embodiments which are not limited to any particular type of work performed by the work environment. For example, it may be used in smart grid asset management, connected health and remote patient monitoring, intelligent plant management, predicting maintenance operations, manufacturing control, intelligent asset and people tracking operations, real-time multi-missile combat systems, and automated high frequency trading. It may also be used, in a connected health environment, to remotely track a patient's heart rhythm and/or glucose levels and provide appropriate alerts and actions when combination of vitals shows any anomaly or is developing an unknown outcome. In such an instance, the proposed system may acquire intelligence from readings of other patients going through similar therapies, monitored through a central hospital diagnostic center, and use that acquired intelligence to dynamically improve the patient's outcome by offering predictive and preventive suggestions and notifications to patients and doctors, reduce the number of doctor visits, help on-demand diagnosis, and perform other hospital functions. As another example, the proposed system may be used in smart-grid monitoring for self-filling of components/actions. Within an unpredictable portfolio of grid connected renewable resources, an inverter monitoring controller may notify and collaborate with substation control environments, switch to distribute loads optimally to avoid overloading, or minimize loss—a situational awareness to optimize demand and distribution of energy in real-time or near real-time. As yet another example, the proposed system may be used to achieve improved efficiency and cost savings in a distributed environment of thousands of trailers each utilizing a broadband transmission by instead employing a terminal aggregator at each trailer and thus only a single broadband for the whole environment and resolve any diagnostic issues with a trailer through local collaboration. The proposed cognitive platform stores pre-fed information and also grows the knowledge in real-time by adding new knowledge or updating the existing knowledge. It processes data and shares knowledge in real-time or near real-time.

The distribution of the new knowledge or updated knowledge may be in real-time or in batch mode depending on the system's need, availability of information, nature of communication, and priority of execution. While each node has a threshold of knowledge that it can store in its database, it has access to a growing knowledge base from its peers and supervisors. The proposed system intelligently addresses mission critical operations locally without depending on a centrally located computing infrastructure and thereby minimizes communication and response latency. Further objects and advantages of the invention will become apparent from a consideration of the drawings and the ensuing descriptions.

BRIEF DESCRIPTION OF THE DRAWINGS

FIG. 3A is an exemplary template of a structured event handled by a cognitive intelligence platform, in accordance with one embodiment of the invention.

FIG. 3B is a high-level mapping structure for an event operation and action handled by a cognitive intelligence platform, in accordance with one embodiment of the invention.

FIG. 3C is a high-level mapping structure for a service registry handled by a cognitive intelligence platform, in accordance with one embodiment of the invention.

FIG. 7 is a high-level depiction of exemplary ISM service layers of a cognitive intelligence platform, in accordance with one embodiment of the invention.

FIG. 8 is a representation of an industrial automation and control system having embedded within it an edge controller and a terminal aggregator.

FIG. 9 is a representation of an edge controller having embedded within it a terminal aggregator.

DETAILED DESCRIPTION OF THE INVENTION

Figure 1:
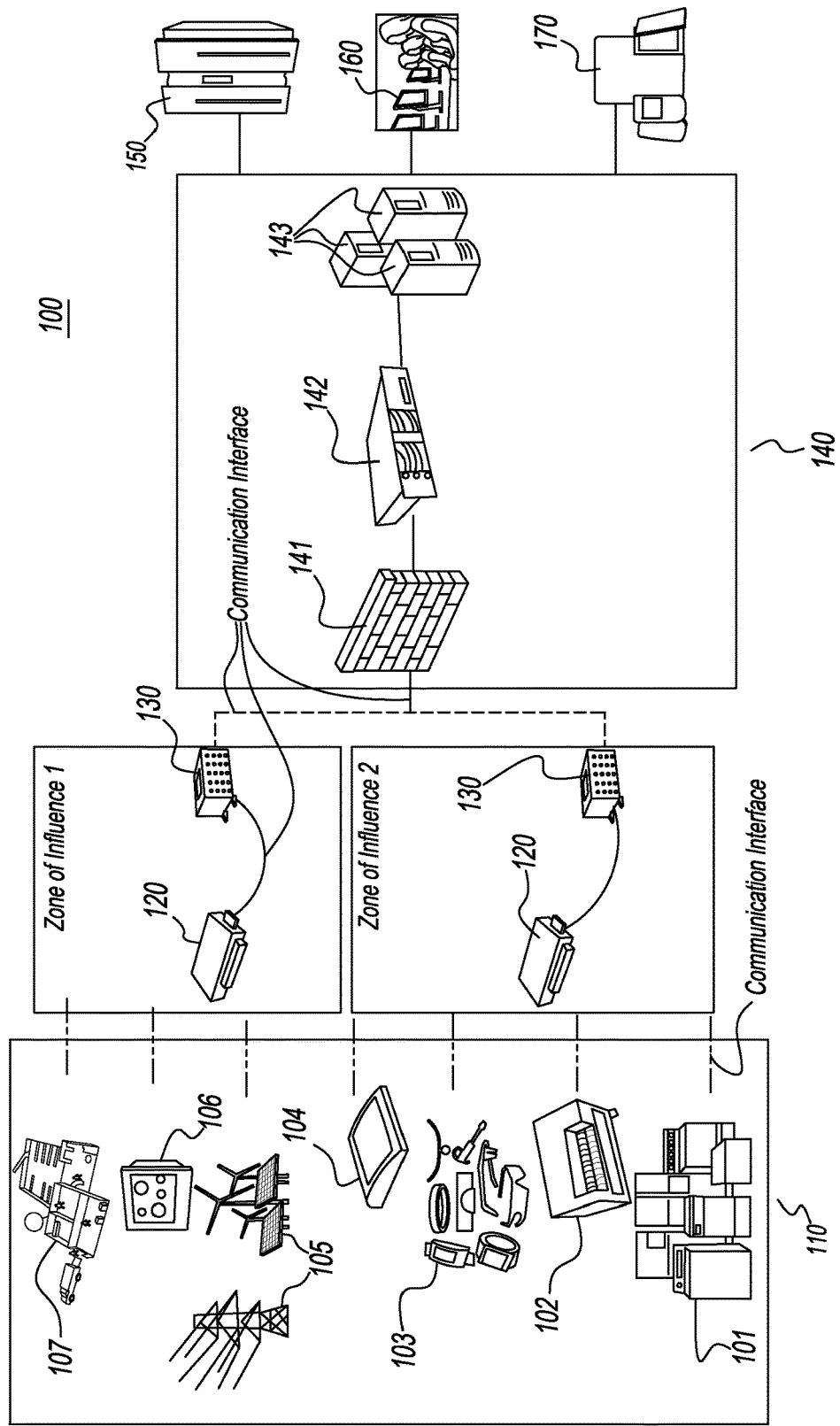
FIG. 1 is a schematic illustration of high-level system deployment architecture of a cognitive intelligence platform, in accordance with one embodiment of the invention.

The following detailed description and accompanying drawings disclose various aspects and/or embodiments of the invention. Alternate aspects and/or embodiments may be devised without departing from the scope of the disclosure. Additionally, well-known elements of the disclosure are not described in detail or have been omitted so as not to obscure the relevant details of the disclosure.

The words "exemplary," "e.g.," "such as," and/or "example" are used herein to mean "serving as an example, instance, or illustration." Any aspect or embodiment described herein as "exemplary," "e.g.," "such as," and/or "example" is not necessarily to be construed as preferred or advantageous over other aspects or embodiments. Likewise, the term "aspect/embodiment of the disclosure/invention" does not require that all aspects or embodiments include the discussed feature, advantage or mode of operation.

Further, many aspects and embodiments are described in terms of sequences of actions to be performed by, for example, elements of a computing device. It will be recognized that various actions described herein may be performed by program instructions being executed by one or more processors, by specific circuits (e.g., an application specific integrated circuit (ASIC)), or by a combination of both. Thus, the various aspects of the disclosure may be embodied in a number of different forms and exemplary embodiments, all of which are contemplated to be within the scope of the claimed subject matter. In addition, for each of the aspects or embodiments described herein, the corresponding form of any such aspects or embodiments may be described herein as, for example, "logic configured to" perform the described action.

As used herein, the term "connected physical environment" or "IoT device" refers to any object (e.g., an appliance, a sensor, etc.) that has an addressable interface (e.g., an Internet Protocol (IP) address, a Bluetooth identifier (ID), etc.) and may transmit information to one or more other devices over a wired or wireless connection. An IoT device may have a passive communication interface, such as a quick response (QR) code, a radio-frequency identification (RFID) tag, or the like, or an active communication interface, such as a modem, an ethernet connection, a transceiver, or the like. For example, IoT devices may include, but are not limited to, smart appliances, smart phones, smart meters, wearable devices, laptop computers, computers, terminals and the like.

As used herein, the term "node" refers to any distinctly identifiable component within the implementation architecture such as, an edge controller, a terminal aggregator, a server, a router etc. that creates, processes, receives, transmits, and/or broadcasts information over a communications channel. As used herein, the term "agent" refers to a subroutine service or any self-contained program performing one or more tasks. An agent may implement an action or provide direction, for example, decision support agent, notification agent etc. As used herein, the term "data" refers to raw data, content, command, event, alert, notification, message, knowledge, service, and/or any other information. As used herein, the term "near real-time" refers to processing of a request (synchronous or asynchronous) within a single session or window of operation with the least possible delay that cannot be avoided because of the priority of various system operations and overheads. In any near real-time processing, the runtime minimizes the latency of a response, feedback, or transmission. The amount of latency or delay depends on the specific application or task.

In accordance with an aspect of the disclosure, a system and method for intelligently leveraging and managing a distributed work environment in or near real-time is provided. Significant improvements in the efficiency of distributed work environments are achieved with a dynamic cognitive intelligence system that not only identifies and resolves known conditions but detects and resolves unknown conditions in or near real-time.

In accordance with an aspect of the disclosure, the unique design of hardware, communication protocol, and software replicates or simulates the self-recognition and reflex pattern of the human or other vertebrate nervous system and allows development of cognitive intelligence at run-time. It adopts the logical layout of the nervous system—sensory receptors, peripheral nervous system, and central nervous system—in terms of processing events, delegating responsibilities, and taking actions based on the situation and context of the operations. Each subsystem and participant node gains a certain level of autonomy in resolving the context and taking localized action on demand by leveraging its defined knowledge, acquired learning, and active support from its peer nodes and designated supervisor controller. The high order processing of cognitive intelligence enables context awareness of the individual nodes by recognizing any unfamiliar situations and adverse events. The nodes resolve these conditions more efficiently in or near real-time and take an action through progressive learning and runtime collaborations.

In accordance with an exemplary embodiment, the cognitive intelligence platform may be implemented, for example, in the distributed environment of connected health and remote patient monitoring. The distributed work environment may be in any suitable industry or field and the invention may take any suitable action to resolve the conditions of the work environment. The system is equipped to handle complex situations involving many variables, related and unrelated conditions, process the information, and implement appropriate resolutions in real-time or near real-time.

As shown in FIG. 1, the high-level deployment architecture of a cognitive intelligence system 100 in accordance with an exemplary embodiment comprises one or more IoT devices or connected physical environment 110, one or more edge controllers 120, one or more terminal aggregators 130, and an intelligent service management hub 140. The system 100 may also include an external system 150, an end user monitoring interface 160, and/or a notification system 170 such as SMS gateway, Push notification system etc. The IoT device 110 may be a smart appliance 101; an industrial automation and control system 102; a wearable device 103; a healthcare monitoring hub 104; a telecom, energy and/or utility device 105; a smart meter 106; a people and asset monitoring infrastructure 107 or some other IoT device. For example, the IoT device 110 may be a wearable glucose monitor worn by a patient.

The edge controller 120 receives input from the IoT device 110, relays it further in the system, and transmits notifications or directions back to the IoT device 110. It collects and processes data, streams, events, commands, notifications etc. as well as exchanges information and knowledge with its peer edge controllers and supervisor terminal aggregators. It wraps the data, contents, feeds, and commands into application level events after processing the raw structured, unstructured, and semi-structured feeds using its own knowledge and/or with the help of its peers and designated supervisor. The edge controller is also responsible for translating command requests, measurements, alerts, notifications and/or any other context aware information. The edge controller 120 is a smart controller, a mobile/wearable device, a microcontroller device consisting of e.g., Zigbee/XBee (Zigbee 802.15.4) or any controller or M2M/IoT interface capable of communicating over peer-to-peer (P2P), broadband, WiFi, Bluetooth and/or any other standard or proprietary wireless or wired protocol within the runtime environment. For example, the edge controller 120 may be a smart phone, a router, a smart watch, a set-top box, or any gateway device. The edge controller 120 may be embedded within the IoT device 110, as shown in FIG. 8. It may use a wired interface for communication within the runtime environment, e.g., when embedded in the IoT device. It uses digital I/O, Bluetooth, Near Field Communication (NFC), RS/232/485 or any other analog/digital interface to connect to the IoT device. The edge controller may have more than one network interface to connect multiple physical endpoints of same or different types.

The terminal aggregator 130 supervises, manages, coordinates, and educates one or more edge controllers 120. It also aggregates, processes, and routes data, streams, content, events, notifications, commands etc. to manage a higher order of complexity and edge controller collaborations as well as exchanges knowledge and data with other terminal aggregators and the ISM hub 140. This grows the situational awareness within the runtime environment. Like the edge controller, the terminal aggregator 130 is a smart controller, a micro-controller device or any controller or M2M/IoT interface capable of communicating over P2P, broadband, Bluetooth and/or any other standard or proprietary wireless or wired protocol within the runtime environment. For example, a smart phone, a router, or a set-top box may be configured to be a terminal aggregator 130. Preferably, the terminal aggregator 130 has more computing power and data/network traffic handling capacity than the edge controller. The terminal aggregator has one logical interface to the EC layer and one logical interface for the TA and ISM layer collaboration, both interfaces utilizing wired or wireless protocols. The terminal aggregator 130 is capable of performing the edge controller functions and may be embedded in the edge controller 120, as shown in FIG. 9, or the IoT device 110, as shown in FIG. 8. When the terminal aggregator is embedded in the edge controller, it has one interface with the ISM. The terminal aggregator may have more than one network interface to connect multiple physical endpoints of same or different types.

According to one aspect of the disclosure, the disclosed system has one or more Zones of Influence. FIG. 1 shows two such zones—zone of influence 1 and zone of influence 2. The zone of influence corresponds to a collaboration boundary defined within the distributed M2M environment where the nodes are connected over wireless or wired interfaces. For example, each zone handles a different type of activity. Depending on the nature of the implementation, a zone comprises one or more terminal aggregators 130 and one or more edge controllers 120 managed by the terminal aggregator(s). The hierarchy within the system creates these zones. Alternately, zone 2 may handle the same type of activity as zone 1 but for a different user. For example, zone 1 may handle data for one patient and zone 2 may host data of other patients in different situations which may be referred by zone 1 to take an intelligent action. The zones communicate with other zones through the terminal aggregators 130. Each node of terminal aggregators and edge controllers has a small footprint of memory to manage the knowledge base, operational rules, action maps, command and event templates, activity logs etc. The memory is non-transitory.

The intelligent service management hub (ISM) 140 is a server infrastructure in a high level computing environment where the management, control, monitoring and reporting actions are performed. It comprises one or more servers 143 in a standalone or clustered deployment environment. The servers in a cluster are interconnected over an event/service bus infrastructure. The runtime environment integrates M1×N1 endpoints (where M1 is the number of TA and ISM nodes and N1 is the number of independent services, routines and/or agents deployed). This allows the nodes to be interconnected for flexibility though they may not always be part of the decision process. All ISM nodes are capable of hosting all the services, agents, or routines involved in ISM operations. The nodes are provisioned for specialized set of services as subgroups of ISM nodes—such as device management, visualization, notification broadcast, analytics on event streams etc. The ISM 140 may also include a firewall 141 and/or a load balancer 142. The load balancer 142 and the event/service bus refer to a centralized service registry and distribute the loads to the specific nodes to achieve parallelism and real-time/near real-time collaboration among the TA and ISM nodes. The ISM server 143 may be, for example, commodity hardware and/or a hardware appliance. Commodity hardware may be, for example, any personal computer. Hardware appliance may be, for example, any big data appliance for specialized tasks.

In one exemplary embodiment, the IoT device 110 communicates with the edge controller 120 through any wired or wireless interface such as LAN, WLAN, WSN, broadband, Bluetooth, Near Field Communication (NFC), Infrared Data Association (IrDA), mesh, Command Line (CL), any serial and parallel communication interface, or any proprietary protocol such as Distributed Network Protocol (DNP3), Modbus, or Real Time Automation Controller (RTAC) built on top of such interfaces. The ECs may also leverage these and other emerging protocols such as Open Mobile Alliance Device Management (OMA-DM), Technical Report 069 (TR-069), Message Queuing Telemetry Transport (MQTT), Constrained Application Protocol (CoAP) or Lightweight M2M in interfacing with external devices and collaborating within their zones of influence. The IoT device 110 may communicate with the edge controller 120 directly or through a separate gateway device. All the components in the zones of influence communicate with one another through any wireless or wired interface over Mesh, WLAN, LAN, WSN, broadband networks etc. The terminal aggregators communicate with each other and with ISM 140 through any wired or wireless interfaces, TCP/IP, broadband, hub and spoke connectivity over LAN/WLAN etc. Using similar interfaces, the ISM 140 may communicate with an external system 150, an end user monitoring interface 160, and/or a notifier 170 to convey the results of the processing and management performed by the ISM. For example, the ISM 140 may send an alert notification to the end user monitoring interface 160 that may be located in a hospital if the data relating to a patient's blood sugar related vitals rises or shows symptoms of an adverse health condition. The external monitoring interface 160 may also be used to view real-time operations of a connected grid infrastructure or floor operations and control systems of any manufacturing. The alert notification may also be sent internally to the specific edge controller. As another example, the ISM 140 may communicate with one external system 150 handling a patient's heart readings and another external system 150 handling a patient's brain readings and collaborate between them. In yet another example, the ISM 140 may process dynamic pricing metrics from external planning control systems and the real-time pricing may be reflected on smart meters connected through the edge controller to implement an advanced demand response application. Such details may be further processed by ISM hubs to detect trends and predict the future price of a commodity such as electricity.

According to one aspect, the architecture of the disclosed platform exploits the point-to-point network topology used by edge controllers and terminal aggregators to effectively design collaboration between the various components and aid event delegation and knowledge sharing within the distributed work environment. Each edge controller is connected to other edge controllers via a homogenous P2P communication and collaboration over a wireless network and exchanges messages, contents, data, and events and seeks knowledge from its peers and designated supervisor TA. The P2P communication between the nodes in the logical layers uses a P2P mesh network or any software system such as a service bus that is able to establish a P2P collaboration or data exchange. Multiple edge controllers may be managed by one or more terminal aggregators which are grouped together for a specific zone of influence representing an interrelated physical event or activity managed by the M2M/IoT implementation. For example, where operations are logically grouped, one EC may report to more than one TA but is supervised by a single TA. In one exemplary embodiment, there is one terminal aggregator for each edge controller. Further, the edge controller and terminal aggregator may be integrated in a single physical device depending on the needs and constrains of the operational environment. As they have almost similar interfaces, communication capabilities and hardware capacity, the infrastructure footprint may be simplified based on the nature of the implementation and physical environment.

According to one aspect of the disclosure, the nodes utilize all available network communication, including both synchronous and asynchronous communications and secure and unsecured communications. Each node runs a set of agents which represents the core functionalities or responsibilities to detect event patterns, process those, and publish or act based on its ability to resolve the context. Terminal aggregators and ISM have the ability to deploy and decommission agents on demand to serve the operational needs of the system. The constituent nodes, processors and subsystems possess different configurations and diverse computational capabilities. The architecture thus delivers a better visibility of the physical environment as a whole, allows flexibility to adjust operational flows by exchanging knowledge and data with the agents seamlessly, and updates various rules and conditions collectively.

Figure 2:
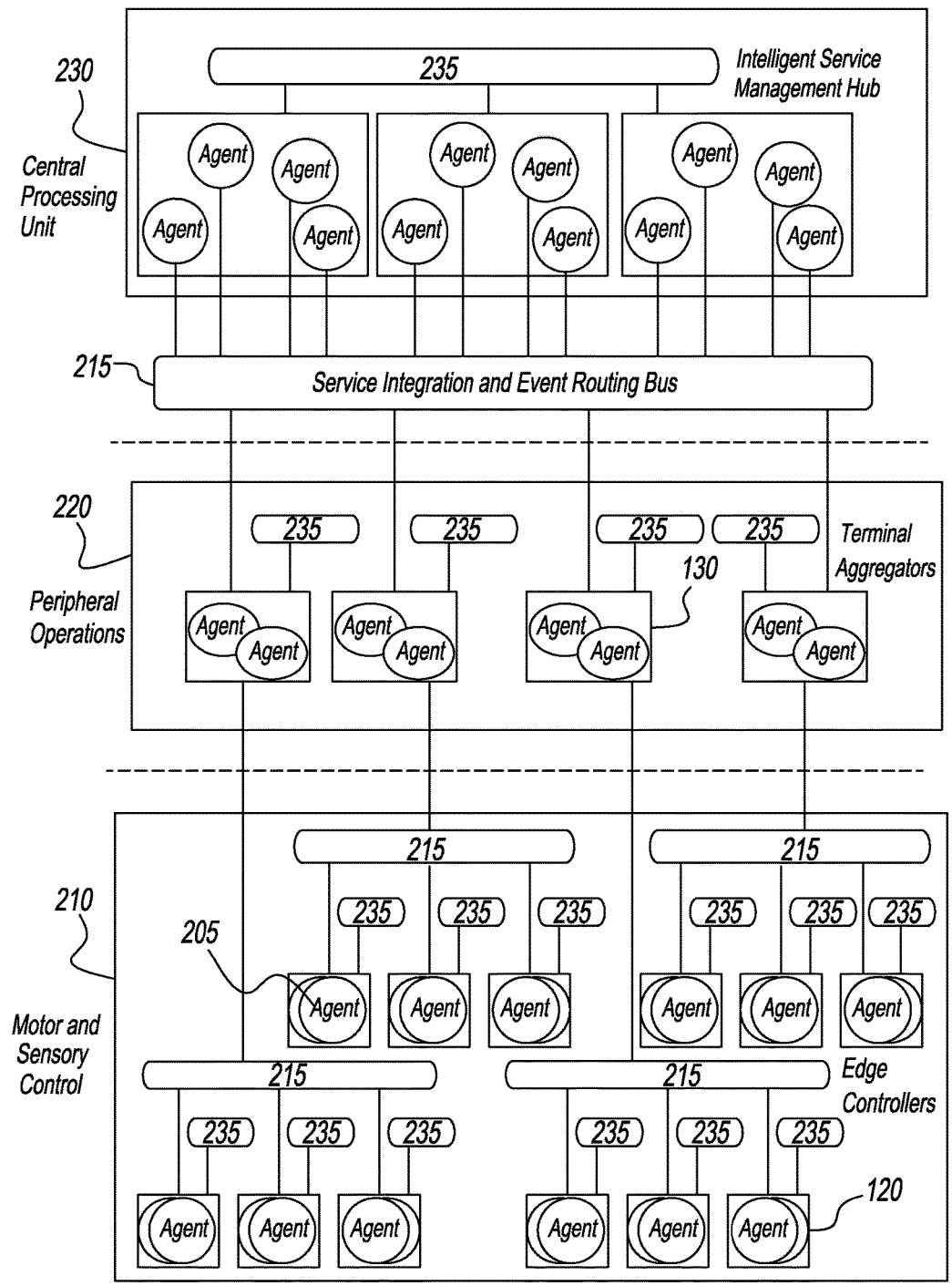
FIG. 2 is a schematic illustration of high-level logical architecture of a cognitive intelligence platform, in accordance with one embodiment of the invention.

FIG. 2 illustrates the logical component architecture of a cognitive intelligence platform, in accordance with one embodiment of the invention. The platform architecture 200 comprises three logical layers or levels—edge controllers (EC) 210, terminal aggregators (TA) 220, and intelligent service management hub (ISM or Hub) 230. Each of the three layers or levels has one or more agents 205 that perform various tasks, e.g. decision support, event correlation, pattern recognition, broadcast of messages, alerts or notifications, service delegation etc. Each agent 205 is a service assembly or programming/software module that may perform one or more tasks by referring to one or more rules and following one or more algorithms. The platform 200 also has service integration and event routing buses ("event routing bus" or "bus") 215 that helps to route the tasks, events, messages and notifications to appropriate service endpoints. Such routing refers to the changing service routing/event delegation rules which are stored in each node, and constantly updated (with the help of peers or supervisors) to aid self-reorganization and cognitive adaption. There is an event routing bus 215 between the Hub layer 230 and terminal aggregator layer 220. There is an event routing bus 215 between the edge controller layer 210 and the terminal aggregator for each zone of influence. The event routing bus 215 stores rules that define how a service performs a task and where the task needs to be sent or broadcast after the service. Individual agents 205 perform tasks and transmit to their respective buses 215 which route them to the required locations. The interconnected nodes exchange events and resolve contexts collaboratively in order to broadcast messages, alarms, notifications, events, data, knowledge, take actions or update existing process environment for automated decision support semantics. The edge controller layer or level 210 is similar to the sensory and motor receptors of the human nervous system and serves to receive instructions for specific operations. This layer connects to a wide range of physical devices, e.g., sensors and microcontrollers, to retrieve raw events, byte streams, structured or unstructured content from the connected physical environment. Each EC has the ability to broadcast the retrieved/received events, service requests and notifications to other ECs within its zone of influence as well as to terminal aggregators to track and manage various complexities. They also relay any commands, alerts etc. back to the connected physical environment.

The terminal aggregator layer or level 220 is similar to the human peripheral nervous system. Each terminal aggregator supervises the operation, control and knowledge distribution for one or more edge controllers. It is a computing backbone that correlates the events and addresses the transient state of operations. TAs aggregate knowledge and form the knowledge base for all registered ECs that are designated for that specific TA. Each terminal aggregator is connected to other terminal aggregators as well as edge controllers for the exchange of events, information, and commands/instructions. The TA layer 220 is also connected to the ISM layer 230 for exchange of the operational data, prescribed collaboration models, commands as well as agents to support growing complexities of the system behavior.

The intelligent service management hub layer or level 230 is similar to the human central nervous system. The ISM is responsible for hosting, distributing, and managing services, infrastructure, and knowledge for the dynamic runtime behavior as a central processing unit or brain of the nervous system. The ISM layer 230 monitors the operations and aggregates the knowledge, including exception conditions, to develop a persistent behavior of the platform and any associated application. The ISM layer 230 uses complex statistical and machine learning techniques and algorithms to resolve the situational needs, update or optimize the rules for the specific subsystems, and route service requests on the fly which reconfigures/enhances the operational semantics. It also permits remote deployment of the agents in order to support autonomic platform upgrades. It provides a single touch visualization of the execution environment and overrides the operational flows. All the logical layers in platform 200 are built on agents/services architecture and therefore support dynamic modularity in each level. For example, a new edge controller can be added to a new location or an agent can be deployed or moved to a new service/task across the logical layers without disturbing the existing runtime. The ISM layer pushes or deploys agents to the terminal aggregator layer and/or to the edge controller layer through the TA layer. The agents or services in the ISM layer are induced internally or by external systems or users. The three logical layers perform their functions independent of their physical location. For example, the physical location of the edge controller 120 does not affect its function. Depending on the structural and behavioral needs of the environment and the required levels of hierarchy, the platform 200 may have one or more additional physical or logical layers.

The agents 205 are interconnected and their skeleton forms a base module of the cognitive intelligence platform. The structured application level events flowing through the agents 205 are analogous to the sensory impulses flowing through the human nervous system. Such agents 205 may also reorganize themselves within the runtime environment to improve operational autonomy across the various layers. A node may automatically attach an agent as required to perform a task and update the rule without shutting down the entire system. The agent 205 broadcasts an event internally or externally depending on its internal service map as long as it has the relevant service to deal with that event. Like the neurons in the human nervous system, the structural construct of the agents in the cognitive platform is same but functionally they handle different events and the agents are combined, connected, organized and realigned in different ways to perform increasingly complex tasks. For example, unlike the edge controller agents, the ISM agents have more capabilities in processing complex events, resolving complex routing and collaborating services on top of an advanced event bus, and involve more libraries for performing more complex tasks. Further, like the human nervous system where the neurons, neurotransmitters, sensory organs and receptors perform various tasks and the human brain interprets those tasks, the cognitive platform 200 has special libraries at edge controllers and terminal aggregators for performing various tasks associated with the node specific operations while the ISM manages how those tasks are performed, monitors, interprets, and optimizes their performance. The semantics of communication and processing is uniform for all the agents to establish a homogenous data/service interchange but the agents collaborate adaptively to adjust to the changing conditions in the runtime. The standardized agent/l service framework design, communication over the event bus infrastructure in a network protocol agnostic fashion as well as different levels of complex rule implementations and knowledge development capabilities ensure a homogeneous runtime with a diverse level of complexity handling capacities to deal with a heterogeneous environment.

The platform 200 also hosts one or more databases (in-memory database, application cache, single node or clustered RDBMS, Log-based File Systems, Big Data etc.) to log configuration parameters, transaction data, rules, knowledge-based process maps, audit trails and other information. For example, the ISM layer 230 hosts a central database 235. In addition, each edge controller and terminal aggregator has its own database 235 that stores information relevant to its operations. Information stored includes, for example, which EC is supervised by which TA and the current knowledge of the logical layers. The databases of ISM layer may be hosted on a cloud. Once an edge controller retrieves a physical event or data from the IOT device, it communicates with other edge controllers within its zone of influence as well as its supervisor TA on how to handle that event or data. If the event is an unknown condition for the TA, the TA will check with other TAs and ISM on instructions to handle that event.

According to one aspect of the disclosure, each logical layer has decision support agents which supervise the self-learning or acquired knowledge and update the rules, learning models, and state-machine configuration to meet the future state operation of the unit. The business logic or operational flow/associated rules of the platform is not tightly coupled with the role and function of individual nodes but more associated with the runtime environment, which constantly changes and accommodates with ever-changing physical and operational events. The light coupling allows any updates to be performed independently without disrupting the runtime. Each component adapts to the changes immediately which offers dynamic modularity within the platform runtime. This also allows for a well-defined separation of concern. The platform deploys implementation specific rules and agents as per pre-defined design strategies. The separation of concern among the runtime behavior of the rules defining the actions, how to do them, and how to transfer the outcomes is not restricted to simply overriding the sequence of operations. Rather, it allows flexibility to move agents 205 horizontally and vertically across the runtime as needed to facilitate intelligent operations. Such movement of the agents 205 and overriding of the rules is influenced by the meta-architecture of the platform.

According to one aspect of the disclosure, the core runtime and the logical layers are hardware agnostic. Each application runtime has these logical layers while the physical implementation of each component or subsystem depends on the computing power, nature of processing, and involvement within the implementation environment. For example, each layer hosts an Open Services Gateway initiative (OSGi) runtime which may be ported on embedded Java or Java 2 Platform Standard Edition (J2SE) foundation. The services components are built as specific agents on top of OSGi and designated to exchange messages, events, and data streams. For example, such routing and mediation is deployed on a smaller footprint of ZeroMQ for EC layer and is configured on a scalable Enterprise Service Bus (ESB) such as ServiceMix, Active MQ, Fuse Mule, Apache Kafta etc. for the TA and ISM layers. The algorithms, rules and complex event processing are implemented on, e.g., JeSS, XAiCML, Drools engine, ILog, JRules, while the features and complexity of the Drools services are provisioned based on the processing capacity and nature of implementations. The software for the disclosed cognitive platform is built using any suitable programming language. For example, C, C++, Java, objective C, Scala, Python, Ruby on Rails, Microsoft.net programming languages or any other programming platform capable of leveraging service oriented application design or agent programming and implementing algorithms as well as supporting basic integration for data interchange over wired and wireless interfaces. The implementation leverages built-in frameworks and/or middleware foundations which are built using one or more programming languages. Such languages, frameworks, platforms and middleware use standard data structure, Extensible Markup Language (XML), JavaScript Object Notation (JSON), flat files and/or any other open standard data formats to process, store and present event, content and data streams used within the runtime environment. Due to their need to manage a small footprint of information on logs, rules and transactions, edge controllers and terminal aggregators leverage a memory database. There are monitoring services in each node to review the latest updates on knowledge, alerts, logs, or any other persistent information and archive, purge or transfer the used content and/or information to optimize the storage capacity and performance of the database in the respective node.

According to one aspect, the disclosed platform architecture aids the extensibility and scalability of the platform from the deployment standpoint. All nodes, including controllers, aggregators and ISM servers, are preloaded with minimum software (agents, service models/assembly, rules engine, event bus frameworks etc.) and the ISM database 235 hosts a repository of agents and service assemblies. Such agents and service assemblies may be deployed within the ISM or ISM runtime environment or transferred to TAs and ECs as needed. Over time, the rules and configurations are adjusted and the agents and service assemblies are organized by the autonomic processes of the runtime and/or the external users. Each agent 205 raises real-time notifications to its peers and supervisor layer to seek support to handle exception conditions or conditions that require a collaboration of more than one node. The response from the supporting nodes may be an immediate action and/or change in the processing rules and configurations to support the conditions as well as deploying additional agents or service assemblies (permanent or temporary) to act on those situations. Any unstructured or structured data and content received by edge controllers are analyzed and aligned against different event templates using existing rules and knowledge. Each node handles one or more event templates pre-defined within the meta-architecture and/or derived from the inbound data and historical data. The complex pattern matching knowledge is leveraged by the runtime to determine the relevance and proximity of the events and relevant actions. The meta-architecture defines the priority and order of such changes. The service complements, rules and algorithms built on the homogeneous runtime are commissioned, transferred and replicated in multiple layers through the gradual learning of the system or an external enforcement to address complexities of the physical environment, disruptions, and mitigate any risk of failure.

In accordance with one aspect of the disclosure, the platform 200 stores queries and algorithms associated with event processing, learning, mediation of services and events, application of knowledge, pattern matching, context resolution etc. Each participant node has the ability to upgrade its operational intelligence as well as the runtime environment of the platform within its capacity through event processing, machine learning and complex artificial intelligence algorithm(s). The pattern recognition techniques utilized by the disclosed platform for event detection, knowledge development, and process optimization leverage sophisticated machine learning and knowledge database discovery algorithms. The machine learning techniques and algorithms are leveraged partially or fully by all nodes across all layers—EC, TA and ISM layers. The process of referring knowledge to improve context awareness of the operational environment, updating service integration state machines, and collaboration among the nodes extends the knowledge and process of the internal runtime of each node as well as its peers and supervisors in real-time or near real-time. The core data/event processing and improvement of context awareness involves Dynamic Multi-Objective Optimization techniques to improve the context resolution, purpose determination, and continuous knowledge development and process automation outcomes over time.

In accordance with one aspect of the disclosure, the cognitive platform 200 implements known algorithms in a specific manner to achieve the objectives of the invention. The process of collaboration continues to inject multiple position vectors within the same context of operation, simultaneously or over time. The process of dynamic knowledge development is incremental and involves both proactive and reactive knowledge optimization and discovery within the runtime environment. When a node seeks an external support to resolve a context and/or interpret an event, it processes multiple resolution templates and determines if there is any conflict among multiple decision vectors. Such decision vectors are prioritized in the order of: frequency of decision vectors and objective functions recommended within the same session; most recent decision vector; and any time sensitivity from the input event. In case of time sensitivity, the first two criteria are treated with equal priority with the 'time-to-live' duration of the context.

Within a specific session, any data stream, content and/or events are extracted and aligned as attribute vectors $V_{(Nm)}$, for example, $$V_{(Nm)} = \begin{bmatrix} a1 & a2 & \ldots & am \\ b1 & b2 & \ldots & bm \\ \vdots & \vdots & & \vdots \\ n1 & n2 & \ldots & nm \end{bmatrix}$$

where m denotes the intervals when the attributes are captured and n denotes the number of data points or readings. In any attribute vector, the attributes possess at least one data point. All attributes may not have same number of occurrences within a particular session window. The event detection service treats the existing event qualifiers as decision vectors to analyze the inbound data, content and/or events which are extracted into the attribute vectors. Each event qualifier represents one or more matching space. The event pattern recognition process applies, for example, Multi-Layer Multiple Kernel Learning (MLMKL) framework to determine the relevance of the inbound attribute vectors against the stored event templates. Each matching space is represented as $X_1^n = \{(x_1, y_1), \ldots, (x_n, y_n)\}$, where $x_i \in R^d$ is the input attribute vector and $y_i$ represents the class label of $x_i$. Considering a multi-dimensional matching space of the event qualification process, a domain of 1-level multi-layer kernels is defined as follows:

$$\Psi^{(1)} = \{k^{(1)}(\bullet,\bullet) = g^{(1)}([\Psi_1^{(1-1)}(\bullet,\bullet), \ldots, \Psi_m^{(1-1)}(\bullet,\bullet)])\},$$

where $\Psi^{(1)}$ denotes the optimization domain and $g^{(1)}$ is a function representing the context, scope and level or layer of execution. The combination of multiple (1-1)-level kernels denoted as "k," which represent a valid kernel from within the operational environment. Considering the resulting optimization domain $\Psi^{(1)}$, the optimization process can be developed for 1-level MLMKL to qualify most relevant event pattern or develop a new pattern which represents the inbound data stream, content and/or events better. The following equation denotes the process of domain optimization used for event qualification and pattern detection in one embodiment:

$$\text{Min}_{k \in \Psi^{(1)}} \min_{f \in H_k} \lambda \|f\| H_k + \Sigma_{i=1}^n l(y_i f(x_i))$$

Where, $l(\bullet)$ denotes the expected loss function. $H_k$ is the reproducing kernel Hilbert space associated with kernel k. The optimization domain of the candidate kernels is represented as $\Psi^{(}$, and $\lambda$ is a regularization parameter. The multi-dimensional analysis and initialization of base kernels of MLMKL offers a better inductive learning within the nodes and each layer of the cognitive intelligence platform. The proximity of the optimization domain with reference to the closest set of matching space determines if the corresponding node may qualify the resulting optimization domain as an inherited knowledge from the attribute vector. Otherwise, the attribute vector is broadcast to the neighboring nodes and supervisor to derive an acceptable optimization domain using qualified multi-layer kernel. Thus, the semi supervised learning process helps the participating nodes and runtime to develop event qualifiers and new event patterns to address the situational awareness in real-time or near-real-time basis.

Further, the TA and ISM layers deploy a knowledge optimization service within their boundary of operations. Each layer of the cognitive intelligence platform introduces new objective domain which either optimizes or creates a new event qualifier and event pattern within the runtime. Such knowledge is fed to the peers and subordinate nodes based on the operational capacity (by evaluating function $g^{(1)}$) and relevance of the knowledge for the target node. The incremental process optimizes the number of layers to improve accuracy and understand the pattern of data, event etc. The incremental learning minimizes the potential loss associated with constructing the optimization domain to deploy persistent cognitive intelligence over time. The process of rearrangement of event qualifier and changing landscape of event templates continues to modify the priority and approach to detect pattern of data/request and process events. Each event template may be associated with one or more action maps which represent a sequence of operations performed on that event. Such operations may be represented as distinct objective function. Within the runtime, processing of each event corresponds to the qualified template and may utilize more than one objective functions which are weighed and deployed in a specific context of operation. As the matching space continues to evolve and process of event qualification and templates change over time, the corresponding objective functions and associated decision vectors also get optimized to represent an improved set of action maps and rules and, embed persistent cognitive intelligence within the runtime. Within a particular context of operation, a time bound analysis and transformation of the objective functions grows the knowledge incrementally. Once the optimization domain determines specific event template, the process of intelligent learning considers closest point inside the multidimensional space of event cloud to shortlist a set of objective functions and decision vectors in order to define action maps for the identified event template. Such process may alter or include the optimized set of objective functions to perform the intelligent operations within the time window of the session. The standard time bound dynamic multi objective technique is deployed to optimize the objective function and decision vectors, which may be, for example, depicted as follows:

$$\begin{cases} \min x \in [L, U] t f(x, t) = (f1(x, t), f2(x, t), \ldots, fM(x, t)) x \in [L, U] t \\ \text{s.t.} \ gi(x, t) \leq 0 \ i = 1, 2, \ldots, p \end{cases}$$

where $t \in R$ is interval; variable $x=(x_1, x_2, \ldots x_n)$ represents decision vector associated with the event templates and action maps; $g_i(x, t)(i=1, 2, \ldots, p)$ represents constraint conditions depending on the time variable interval t; $D_{(t)}=\{x|g_i(x, t) \leq 0, i=1, 2, \ldots, p\}$ represents the decision vector space; $[L, U]_t=\{x=(x_1, x_2, \ldots, x_n)|l_i(t) \leq x_i \leq u_i(t), i=1, 2, \ldots, n\}$ represents the search space representing a set of optimization functions and decision vectors corresponds to the set of contextual action map associated with close set of event patterns. The derived set of optimized objective functions and decision vectors are injected within the runtime to represent an action map and process intelligence applied on most recent event patterns within the optimization domain.

Any redundant outcome from determining the most preferred objective of any given context may also be resolved by seeking assistance from the peers and supervisors. If the processing fails to derive the optimization domain or identify any relevance with an existing event pattern within the search space and the defined time window, such request flows up in the hierarchy unless the resolution for the optimization domain is obtained and a set of objective functions are applied on the new/modified events. If such optimization process does not obtain any satisfactory result, the runtime logs that event as an exception. Such exceptions may be analyzed and processed with an external system or user intervention. Due to its limited ability for complex processing and the smallest window of processing time within the EC environment, the complex dynamic minimization of the objective functions are generally processed in TA and ISM nodes. The real-time or near real-time operations in TA and ISM thus allow for proactive knowledge development, improve the cognitive process, and incrementally improve collaboration across the nodes. The system processes the data, events, streams etc. in real-time or near real-time. Any knowledge, awareness, and/or feedback gained from such processing is relayed in real-time and/or asynchronously. For example, if the knowledge gained is not going to be used by the relevant EC immediately, the system may propagate it at a later time along with any other such knowledge gains. Thus, depending on the availability of resolution from the supervisors nodes, the most appropriate objective is fed back to the requesting node in real-time, near real-time or in batch mode. The supervisors, e.g., TAs, continue to monitor the logs from their child nodes, e.g., ECs, to determine the decision vectors and decision templates used. The supervisor determines best coverage of the objective functions and decision variables with reference to the base objectives associated with pattern detection and process automation. Each node maintains multiple versions of the decision vectors over time to align specific event or process state machine with the most appropriate knowledge and process templates. The time bound function and qualification of the decision vectors protects the context sensitivity of the execution/collaboration of the participant nodes and the changing operational intelligence landscape, and minimizes latency. Since the reactive learning from supervisors elevates the intelligence and efficiency of the nodes, the associated decision vectors induced by the supervisors are treated with higher priority and override the time sensitivity rules. The algorithmic foundation of the platform offers a dynamic multi-layer multi-objective optimization mimicking the human nervous system's acquired or induced learning, where the nature of decision vectors and the associated variables are influenced by the nature of the implementation (functional) and the nature of the interactions with the physical environment (structural). The cognitive platform 200 may utilize any other suitable known algorithm for pattern recognition, knowledge development, and other functions.

According to one aspect of the disclosure, the ability of the nodes to upgrade their operational intelligence develops a situational awareness which may be replicated across the shared and distributed network through P2P collaboration. Such execution environment utilizes the cognitive intelligence semantics to address the growing complexity and sequential and temporal disruptions to aid real-time decision making and develop an autonomic behavior through collaboration. Such collaborative learning is possible at different levels of event, signal, data and stream processing in the IoT platform layers. Each participant has the knowledge to process information independently and in collaboration with others by leveraging the knowledge of individual participants. Based on the available knowledge of the runtime, cognitive intelligence also determines which sequence of process yields best results—horizontal, vertical or both. The best option is determined based on the shortest path, the time to resolve, and/or any pre-defined preference mentioned in the metadata of the nodes. Thus, such process may alter, add, or remove any sequence of execution with respect to the specific context of the operation.

FIG. 3A depicts a sample event template handled by the cognitive intelligence platform, in accordance with one embodiment of the invention. The translated event 300 comprises a header 310 and a body 320. The header 310 comprises various data such as unique identifiers, references, flags and/or tokens to expedite the delegation and qualification process. It has time references that denote any event generation time and any event lifespan. It has an event sink which specifies the destination nodes and/or service endpoints. It has a parent ID which denotes the source, e.g., application level service that produced the event. The body 320 of the event comprises a group ID that identifies the context or correlation with other events. The body 320 contains structured and unstructured data and byte streams. It includes measurement attributes for identifying various data points or their states and any context parameters beyond identified ones. The body 320 also maintains action logs that contain an audit trail of actions and outcomes within the lifespan of the event. The body 320 also has any specific service requests embedded by the source nodes or service agent. The individual node, for example, the edge controller, first acts on the header 310 and if qualified, then acts on the body 320 of the inbound events and generates outbound events, service requests, alarms or notifications based on its ability to interpret and process. These are consumed and transferred by interconnected nodes and systems. The parameters and structure may vary depending on the nature of the implementation and the relevant rules. The knowledge is derived based on the new template—either acquired or derived from the operational environment.

FIG. 3B and FIG. 3C illustrate the high level mapping structures for events, actions and services handled by the cognitive intelligence platform, in accordance with one embodiment of the invention. They show how the cognitive intelligence platform refers to various standard constructs to perform the runtime which continues to change depending on the situation. FIG. 3B is an exemplary event operation and action map. It corresponds to specific events and specific actions on the events and associated sequential or temporal or composite combination of event clusters. An event goes through multiple services and various processing, e.g., which knowledge to use, which destination to route the events etc. The map comprises an event ID 331 that identifies the event; a knowledge ID 332 that identifies which knowledge and decision vectors to use; a temporal/sequential notation 333 that denotes whether the event generated after an action is temporal and non-conclusive, sequential or simple; and/or a source producer 334 that denotes who produced the event—an internal source or an external producer service. The map may also include a parent/dependent ID 335 that identifies the parent who generated the event; and/or an action/rule 336 that identifies the service execution path or the services that the event proceeds through. If an event is temporal and not conclusive, the system combines it with one or more other events. FIG. 3C is an exemplary service registry map for the event, in accordance with one embodiment of the invention. It corresponds to service endpoints, associated rules and knowledge deployed or upgraded by the individual node or its child nodes. This map comprises various information such as a service ID 341 that identifies the service performed, an action/rule map 342 that specifies which rules to implement for the service and their order, a system/node ID 343 that identifies the node where the service is performed, a service agent ID 344 that identifies which service goes to which agent, a parent service ID 345 that identifies the parent service of the service performed, a mediation rule ID 346 that identifies the route for the service outcome from the action/rule map 342, and/or a last updated notation 347 that shows the date or time of the last event update. These maps are updated in or near real-time to support the system's growing level of intelligence and achieve a dynamic runtime. These maps are stored in one or more of the databases.

Figure 4:
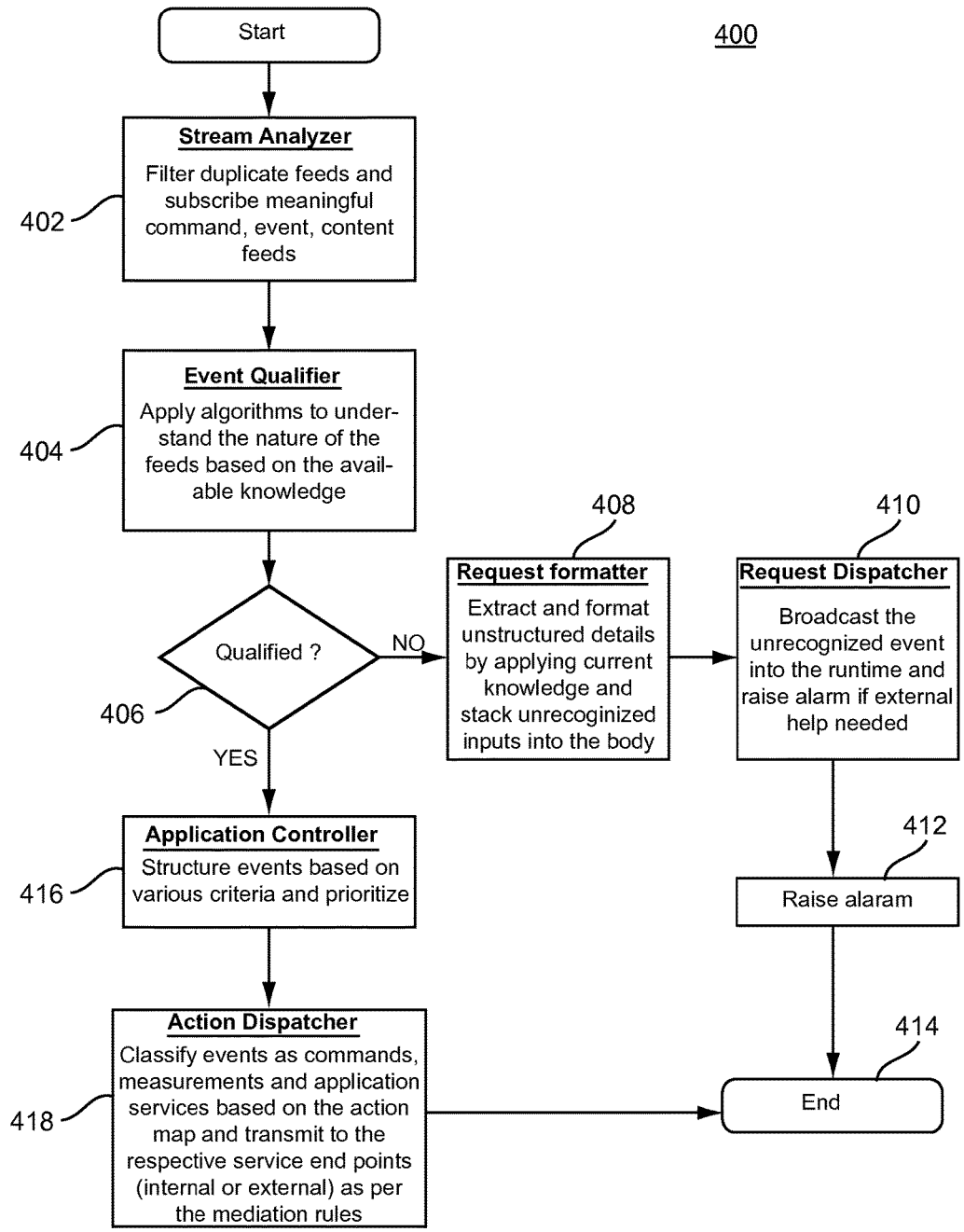
FIG. 4 is an exemplary flowchart of a process of analyzing and aggregating a physical event by a cognitive intelligence platform, in accordance with one embodiment of the invention.
Figure 5:
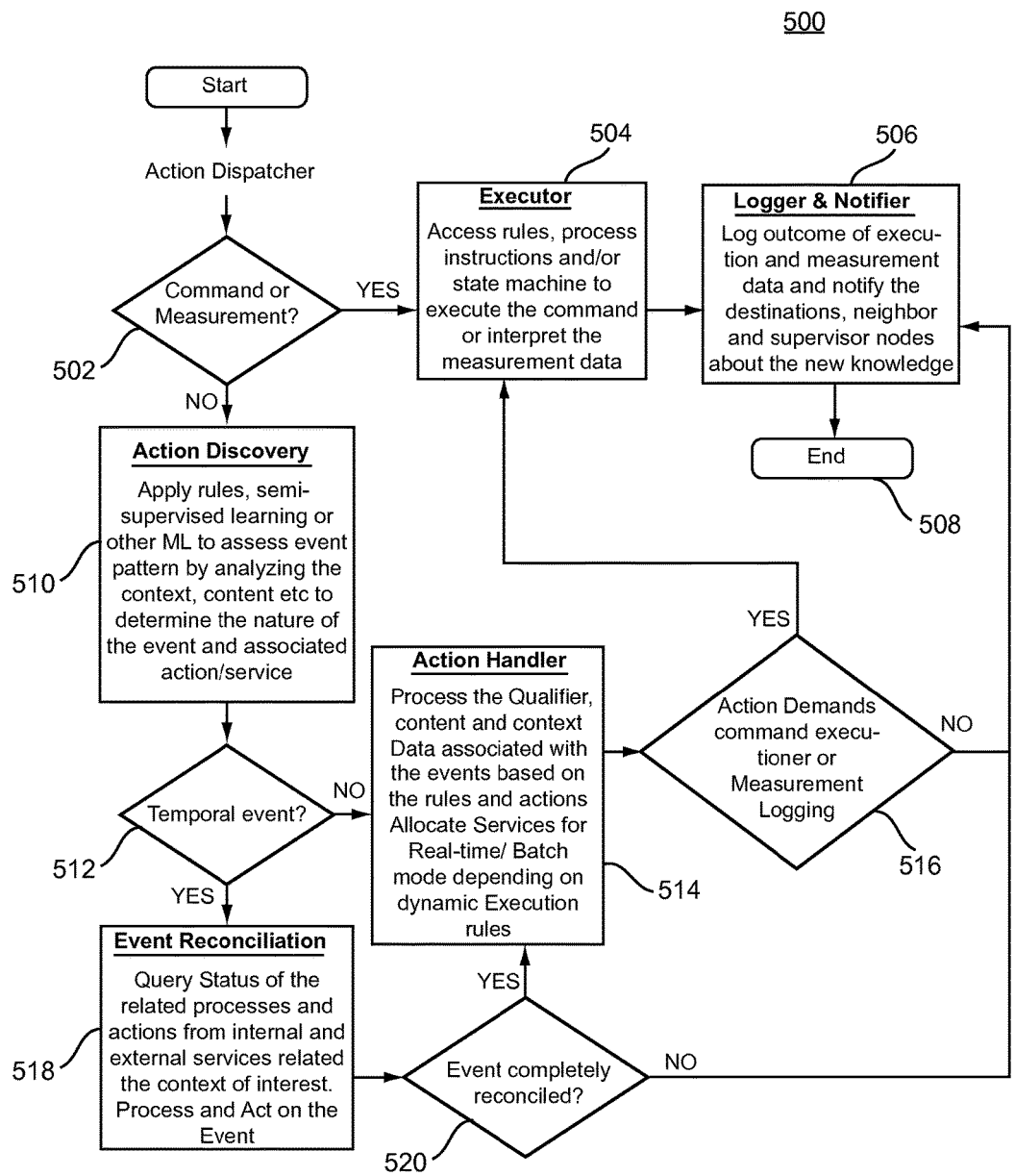
FIG. 5 is an exemplary flowchart of a process of processing a physical event and command notification by a cognitive intelligence platform, in accordance with one embodiment of the invention.
Figure 6:
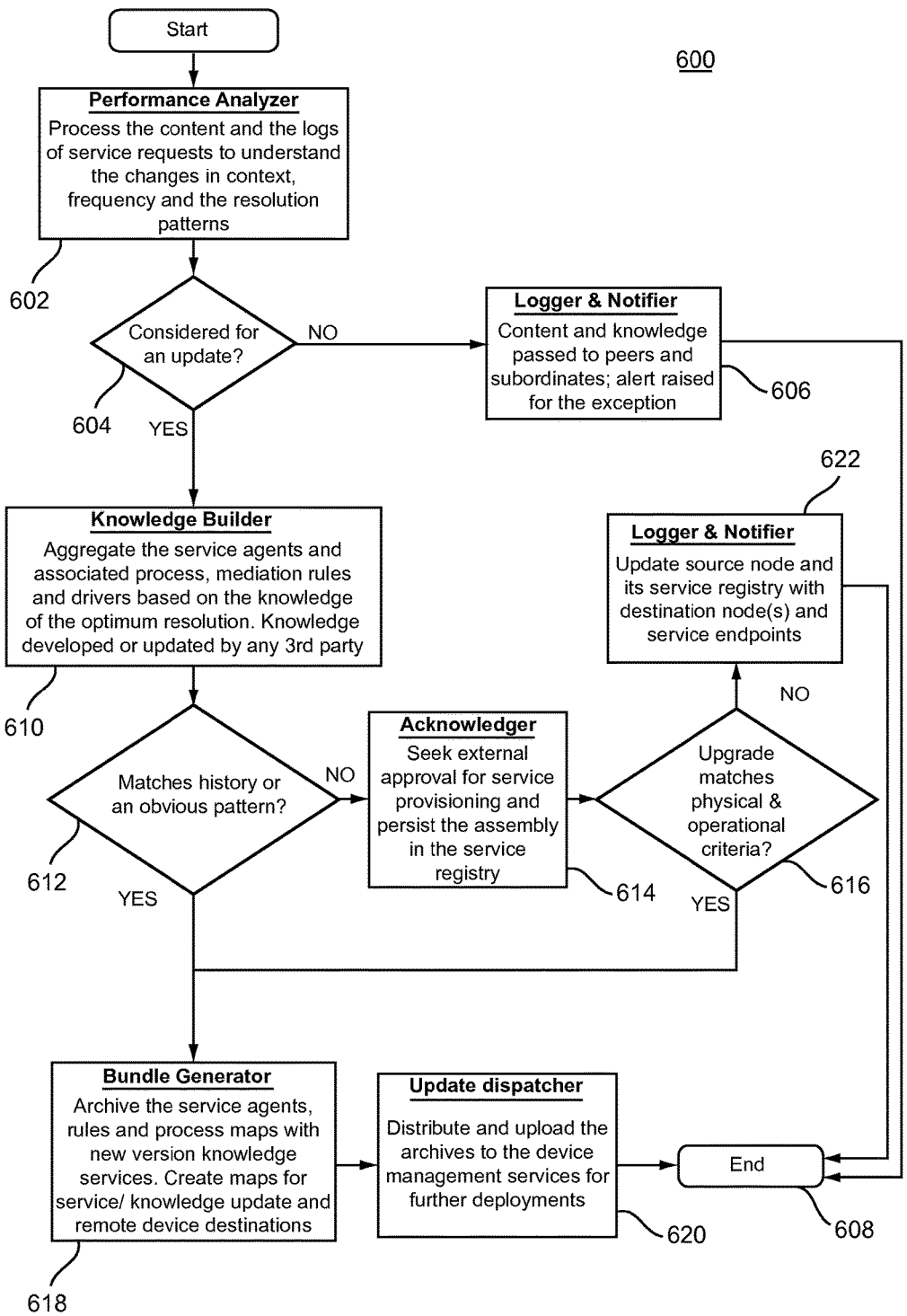
FIG. 6 is an exemplary flowchart of a process of updating the service and knowledge handled by a cognitive intelligence platform, in accordance with one embodiment of the invention.

FIGS. 4-6 illustrate an exemplary template of the service level interactions in the cognitive intelligence platform, in accordance with one embodiment of the invention. The entire process is performed through a set of interrelated services which have been identified to present a logical interaction among various operations to implement, enhance and distribute cognitive intelligence across the runtime. Different implementations of the platform may have different combinations of the service interactions based on pre-deployed agents 205, their interactions as well as the reorganization of the agents 205 through collaborative learning.

FIG. 4 is a flowchart illustrating an exemplary method 400 of analyzing and aggregating the physical events handled by the cognitive intelligence platform, in accordance with various aspects of the disclosure. At step 402, a Stream Analyzer service analyzes the incoming raw data streams and/or events from the external environment to eliminate any duplicate and redundant feeds and content. After filtering out this material, the Analyzer accepts the meaningful events at various levels and transfers those for qualification process. At step 404, an Event Qualifier service applies one or more learning techniques and pattern recognition algorithms to understand the relevance of the events and feeds within the operational environment. This process matches the event or feeds against the available knowledge and understands the nature of action required to be performed on the events. At step 406, the system determines if the event or steam is qualified. If it is not qualified, at step 408, a Request Formatter service processes the stream. It extracts and aligns the unstructured, semi-structured and structured details into a structured application level event that the system recognizes by applying the current knowledge. The unrecognized inputs are then stacked into the body of the event. At step 410, a Request Dispatcher service receives the formatted unrecognized events and broadcasts them to the network. The header of such events has the source, context, location and time details along with the 'seek' flag to notify that the events are not processed against known parameters and service definitions. The peers and supervisors subscribing to such events follow similar steps to qualify the events or streams and the process of qualification at step 406 continues until the source receives an acknowledgement from any node of successful processing or meaningful resolution. If such events or streams are not acknowledged by the services from the ISM, an Alarm Raiser will raise an alarm at step 412 in order to receive an external help from other systems or human operations. This ends the event processing at step 414. On the other hand, if the qualification process at step 406 results in a matched and qualified event, the system proceeds to step 416. An Application Controller service then structures the events based on the qualified criteria to construct an exact or close match to the template format. It extracts and organizes the context, source, route and other distinct parameters and sorts the events based on priority. The processed events are delegated to an Action Dispatcher service for further processing. At step 418, the Action Dispatcher understands and classifies the event as a command, measurement, or application service request based on the latest event action map. It updates the destination flag of the event and dispatches the event to the respective service end point as per the rules. The service endpoint may be internal to other edge controllers in the zone or external to edge controllers outside the zone. This ends the event processing at step 414.

FIG. 5 is a flowchart illustrating an exemplary method 500 of processing and notification of the command events by the cognitive intelligence platform, in accordance with various aspects of the disclosure. At step 502, the Action Dispatcher service classifies the structured event as a command or measurement or application service request. If the structured event is a command or measurement, the system goes to step 504. An Executor service processes the event by accessing instructions, state machine, and applying defined rules. It extracts and interprets the measurement data. It executes the series of commands to be applied in the operational context. Thereafter, at step 506, a Logger and Notifier service logs the outcome of the execution and measurement data. The neighboring nodes, configured or updated destinations, and supervisor layers are notified about the execution and the new knowledge gained in this process. This ends the command processing at step 508.

On the other hand, if the structured event at step 502 is not a command or measurement, for example, an application service request or temporal event, then the system goes to an Action Discoverer service in step 510. The Action Discoverer analyzes the pattern of the event by analyzing the context, route, source, content, and/or data to determine the nature of the event and/or associated service. It applies standard rules or semi-supervised learning or other machine learning or pattern recognition algorithms to perform this analysis to determine the events as either temporal or persistent. At step 512, the process determines if the event is temporal or persistent. The event is delegated to the most appropriate service endpoint (internal or external) for further processing. If the event is not temporal, the process proceeds to an Action Handler service in step 514. The action handler processes and interprets the qualifier, content, and other context data associated with the event. Based on the available knowledge, the service allocates the respective actions for real-time or batch mode processing of the event. For example, a successful logging of an event that does not impact the next action need not be distributed by a TA in real-time. Thus, any process that may be flagged as not requiring immediate attention may be processed in batch mode. Whether a service should undergo real-time or batch mode processing is defined in the templates. To provide a dynamic runtime, any intelligence collaboration and transfer happens in real-time while any feedback and knowledge propagation may happen in real-time and/or batch mode. At step 516, if such processing requires any command or measurement analysis, the event goes back to the executor in step 504 for further processing. Otherwise, the Logger and Notifier service in step 506 logs the temporal event processing outcome. It also notifies the neighboring nodes, configured or updated destinations, and supervisor layers about the execution and the new knowledge gained in this process. This ends the temporal event processing at step 508.

On the other hand, if at step 512, the event is temporal, then the process goes to an Event Reconciliation service at step 518. The Event Reconciliation tracks the status of the outcome of the associated event state machines and applies the respective rules to processes the event to produce and output persistent information, new application event, command, alarm or notification. Then at step 520, the system checks if the event is completely reconciled. If it is not, it goes to the Logger and Notifier service at step 506 for further collaboration. If the event is reconciled, the process goes to the Action Handler in step 514. This process repeats until the event is completely reconciled. Any new knowledge built in this process is distributed and stored in the runtime environment to improve the context awareness. This ends the temporal event processing at step 508.

FIG. 6 is a flowchart illustrating an exemplary method 600 of updating the service and knowledge activities handled by a cognitive intelligence platform, in accordance with various aspects of the disclosure. It is a synchronous process performed at or near real-time depending on the priority. These processes are generally performed at the supervisor level of terminal aggregator and/or ISM layer. A Performance Analyzer at step 602 receives and logs the content, updated knowledge, and alerts from the event. It analyzes the changes in context, frequency of occurrence, relevance of the content, and any resolution patterns. At step 604, the process determines if an update to the content and logs is required. If no update is required, the process transfers the event content at step 606 to a Logger and Notifier service. Here the content, data and knowledge is passed to the peers and subordinates. It may also be passed to supervisors based on the situation. For example, the system may log that it failed to resolve a task. Or it may log that it successfully processed the task so it may be referenced in future. Alternately, an alert for an exception is raised on a need basis for manual intervention. This ends the processing of the service and knowledge updates at step 608.

On the other hand, if an update is required at step 604, the analyzed data and knowledge are transferred to a Knowledge Builder service at step 610. The knowledge builder aggregates the agents and rules associated with the services. It also applies machine learning techniques and algorithms, mediation rules and drivers based on the identified optimum resolution. The new set of knowledge and aggregated results are created and updated by any third party, e.g., an external system or human intervention and the process proceeds to step 612. At step 612, the Knowledge Builder processes the assembly of gathered data, knowledge, alarm and content with the stored patterns and history for any matches. If there is no match, the process goes to an Acknowledger service in step 614. The acknowledger requests approval from supervisor or external administrator to provision a new service or upgrade service maps. An upgrade may be knowledge, service or a combination. Then at step 616, the supervisor or external administrator determines if the upgrade based on the desired change is a match with existing physical or operational criteria. If the upgrade is not qualified against existing physical and operational criteria, e.g., the edge controller is not physically capable of handling the upgrade, the process goes to a Logger and Notifier in step 622. Here the service updates the source node and its service registry with destination nodes and service end points.

But if there is a match with pattern or history at step 612 and/or if the upgrade matches the existing physical and operational criteria at step 616, then the process goes to a Bundle Generator service at step 618. The bundle generator aggregates the structural and functional modules in order to upgrade the service portfolio and knowledge of the destination nodes. It processes the input event or data into a structured application level event and delegates it for propagation. It archives the service that includes agents, rules and/or service maps as a new knowledge for the processing units. Then at step 620, an Update Dispatcher service updates and uploads the new service module metadata to the remote nodes which are identified as destinations for such service and collaboration upgrades. The dispatcher distributes and uploads the archives to the device management services for deployments. The process updates the service registry maps across the nodes by broadcasting the change from the ISM layer. This ends the processing of the service and knowledge updates at step 608.

According to one aspect of the disclosure, the entire process of analyzing and aggregating the physical events, processing and notification of command, events, and updating the service and knowledge activities works to improve and transform the collaboration and self-organization associated with cognitive intelligence. The changes to runtime become a consistent knowledge against the specific context of the execution for the runtime and are stored within one or more nodes in real-time or near real-time. In addition to the service agents described in FIGS. 4-6, the system may also have complementary helper services as well as actions, command and/or measurement handlers to support application-specific functions, management and business processes. Complementary helper services include, for example, data service exchange with the external system; adapters for marshalling protocol specific commands/measurements; and archiving the knowledge data for most up-to-date information within the limited memory space. Such agents, rules and knowledge related to basic operational responsibilities are built as per the meta-architecture specification and are often inherited from the service framework design aspect of the cognitive intelligence implementation architecture.

FIG. 7 is a high-level depiction of the centralized service component architecture of the intelligent service management hub (ISM) layer of the cognitive intelligence platform, in accordance with one embodiment of the invention. One or more service agents supporting processing are deployed in the server cluster of the ISM which may be horizontally scaled to support the performance, scalability and extensibility of the distributed runtime environment. The ISM comprises several service layers. It includes an Event and Service Mediation layer 710 that defines the interactions between the other service layers 711-725 and how they will be routed through the ISM bus. The ISM has a central Knowledge Management layer 715 that manages different knowledge and encompasses a set of integrated services 711-714. An Acquisition layer 711 is responsible for analyzing events, contents, streams, and/or data to acquire new knowledge from the event processing and service interactions within the lifetime of the event. An Optimization layer 712 optimizes the persistent knowledge base from multiple knowledge options for a given context. A Query/Explain layer 713 provides the most appropriate knowledge (proactive and reactive learning) to be passed on to a destination in response to a query for the applicable knowledge for a given context. Such query operation may be performed in both real-time (analytics on streams of data or events) or in a batch mode of operations (predictive or preventive analysis of the cognition development). Such awareness may be referred and deployed in various distributed nodes within the runtime environment. A Rule and Process Transformation layer 714 changes the rules to allow the use of the new knowledge and aids the transformation of operational and structural collaboration among the nodes, subsystems, and connected physical environment. Such changes may be replicated across the nodes as needed to reflect the most up-to-date knowledge of the operational environment.

The ISM Hub also hosts one or more well-defined services to manage core operations of the runtime. An Analytics on Stream 716 offers real-time or near real-time analysis of the events and resolution of the contexts and notifies specific services or initiates necessary actions. An Alarm and Notification 717 processes and routes any generated and transmitted alerts, exceptions, and notifications to the internal service endpoints as well as the external channels connected to the runtime. A Business, Transaction and Security Handler 718 provides a set of APIs which may be accessed by an external environment for specific applications to interact with the cognitive intelligence runtime environment. It also provides various security service APIs used by the nodes to encrypt the data, channels and/or the transactions performed as well as for interacting with the external IoT environment and server infrastructure. The Hub has an External Services and Information Integration 719 to interface the external systems. A Big Data Analytics 720 provides advanced analytics relating to data and event mining and other complex operations and hosts a large volume of data related to the configuration, knowledge, rules, events, and/or transactions performed within the system. Such infrastructure supports a large scale exponential growth of data over time and improves the analysis, knowledge, and diversity of operational complexity to grow the cognitive intelligence footprint. This provides real-time analytics, near real-time analytics, and rapid batch mode processing to aggregate and correlate the system, operation, and rule-specific data to develop new insights, notifications, and knowledge. The runtime of the big data analytics offers a continuous learning on top of the growing data and facilitates training of the respective nodes over the lifecycle of the runtime environment. The architecture of the service level partitioning helps the system scale vertically and horizontally by deploying need based services and agents to complement and extend new operational intelligence and thereby, gain scalability and extensibility incrementally, without disrupting existing run-time.

The ISM Hub also has an Action/Rule/Service Management layer 725 that provides rules for implementing the knowledge in the system and managing the operational intelligence. It processes, modifies, and applies various broad categories of rules and/or execution policies which are leveraged by other service components to perform the required operations as well as change the behavior based on the most recent knowledge gained by the runtime environment. Layer 725 encompasses layers 721-724. An Actions/task Handler layer 721 provides rules to handle events, notifications and commands within the runtime environment. The rules and instructions specify the specific actions to be performed on the inbound and outbound events, command and/or data streams. Layer 721 refers to 722 and 723 to construct the processing lifecycle to perform real-time, near real time or batch mode of operations. A Process Rules layer 722 provides rules for algorithms and tasks performed by various service components once the service is invoked or data fed into the runtime environment. These rules specify how to process the data based on the defined parameters and the knowledge gained. Mediation Rule layer 723 provides the workflow corresponding to the processing lifecycle within the runtime environment. These rules are referred by specific services and event/service bus infrastructure of ISM to route processed events, commands, notifications, data and all contents from one service to another based on defined and acquired knowledge of execution. The knowledge and execution policies as well as the priority of order/tasks affect the mediation rules to achieve a dynamic state machine within the runtime environment. Management Policies layer 724 provides rules and policies for infrastructure configuration, boundary conditions, communication, administration, and hierarchy of the layers. These rules also specify the nature of services and interactions for nodes which may be deployed at various layers of the runtime environment. Layer 724 maintains updated information on service versions, change logs, and exceptions. Thus, the service elements are loosely coupled with the actions, processes, management, and mediation semantics. The continuous learning and knowledge exchange of various nodes is consolidated at the ISM which updates various rules and policies for processing of data, event, content etc. as well as service level interactions across the runtime environment.

According to one aspect of the disclosure, the runtime architecture of the ISM emphasizes a well-defined separation of concerns among the knowledge development and management services; action handlers and tasks; and operation/integration/management of rules. The multichannel Visualization, Service integration and Management layer 730 is present horizontally on top of the service runtime of the ISM to monitor, control and deploy cognitive intelligence services and application specific functions. The ISM integrates high performance computing, complex event processing, low latency event/service bus, analytics on stream, artificial intelligence and machine learning APIs and big data middleware on top of the distributed server infrastructure. Following the functional isolation and integrated decision support pattern of the human central nervous system, a collection of services and agents are deployed to perform parallel tasks related to logging activities, management and monitoring of distributed TA and EC controllers, deployment and optimization of existing rules and knowledge within the runtime while the runtime collaboration and ISM provide the integrated decision support.

The present invention allows for the dynamic learning of the growing intelligence in any distributed M2M/IoT platform. Upon successful processing of unrecognized events by a particular node, that node is preferably trained to handle such events by upgrading the requisite rules, knowledge and/or commissioning service agents. Such training is facilitated by the supervisor node by assessing the capacity, context and collaboration semantics associated with the child node. If the receiver is not upgraded with new processing capability, the action map is updated with the destination node and the service endpoint details, which may be referred for order processing in the future. Events generated from a single node are transmitted to multiple nodes and exchanged simultaneously. Each node has the ability to execute its own intelligence to analyze the context and pattern of the data, event or operational behaviors. The notifications update the list of nodes and subsystems, which in turn help the system partition the knowledge treatment, learning and actions relevant to the wider context of operations within any zone of influence. The supervisor nodes have visibility of the operational dynamics, exceptions and overheads (redundant flows, latency etc.). Therefore, both TA and ISM nodes continue to monitor existing execution patterns against the changing portfolio of services registry and action maps. Over time, the system gains knowledge and/or awareness to address new situations. The new knowledge is stored in ISM which may transfer it to one or more child nodes. The system gains contextualized knowledge to provide localized action without disrupting the existing operational environment. As a result, the supervisors are able to determine an optimized state machine and corresponding runtime behavior and reorganize the service agents, rules, knowledge, and service-action maps to improve the collaborative runtime performance and provide new knowledge for real-time or near real-time decision making and adjust actions of the operational entities as a whole. Such attributes of enhanced intelligence help the distributed M2M and IoT networks to enhance the response time, improve preventive, prescriptive and predictive decision supports in an incremental fashion and, scale system and operations horizontally and vertically with minimum disruption.

Each of the above identified processes corresponds to a set of instructions for performing a function described above. The above identified programs or sets of instructions need not be implemented as separate software programs, procedures or modules, and thus various subsets of these modules may be combined or otherwise re-arranged in various embodiments. For example, embodiments may be constructed in which steps are performed in an order different than illustrated, steps are combined, or steps are performed simultaneously, even though shown as sequential steps in illustrative embodiments. Also, the terminology used herein is for the purpose of description and should not be regarded as limiting. The use of "including," "comprising," "having," "containing" and variations thereof herein, is meant to encompass the items listed thereafter and equivalents thereof as well as additional items.

The above-described embodiments of the present invention may be implemented in any of numerous ways. For example, the embodiments may be implemented using various combinations of hardware and software and communication protocol(s). Any standard communication or network protocol may be used and more than one protocol may be utilized. For the portion implemented in software, the software code may be executed on any suitable processor or collection of processors, whether provided in a single computer or distributed among multiple computers. Such processors may be implemented as integrated circuits, with one or more processors in an integrated circuit component, or any other suitable circuitry. Further, it should be appreciated that a computer may be embodied in any of a number of forms, such as a rack-mounted computer, a desktop computer, a laptop computer, single board computer, microcomputer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, the various methods or processes outlined herein may be coded as software that is executable on one or more processors that employ any one of a variety of operating systems or platforms. Additionally, such software may be written using any of a number of suitable programming languages and/or programming or scripting tools or a combination of programming languages, and also may be compiled as executable machine language code or intermediate code that is executed on a framework or a virtual machine. In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form.

The terms "program" or "software" are used herein in a generic sense to refer to any type of computer code or set of computer-executable instructions that may be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention. Computer-executable instructions may be in many forms, such as program modules, executed by one or more computers or other devices. Also, data structures may be stored in computer-readable media in any suitable form. Any suitable mechanism may be used to establish a relationship between information in fields of a data structure, including the use of pointers, tags, or other mechanisms that establish relationship between data elements.

It is to be understood that the above-described embodiments are only illustrative of the application of the principles of the present invention. The illustrative discussions above are not intended to be exhaustive or to limit the invention to the precise forms disclosed. Various modifications and alternative applications may be devised by those skilled in the art in view of the above teachings and without departing from the spirit and scope of the present invention and the following claims are intended to cover such modifications, applications, and embodiments.

What is claimed is:

1. A computer-implemented method for decision support for an Internet of Things (IoT) network operating in an external environment comprising IoT devices, the method comprising:
   (a) retrieving, via one or more edge controllers, inputs from one or more of the IoT devices; and
   (b) processing the inputs with one or more edge controllers, one or more terminal aggregators, and one or more servers organized into three or more levels of processing, wherein each of the one or more edge controllers, each of the one or more terminal aggregators, and each of the one or more servers is a participant node;
   the processing comprising the steps of:
      (i) a first participant node matching the retrieved inputs against currently available knowledge within the first participant node;
      (ii) wrapping the inputs into application level events;
      (iii) attempting to qualify events using event qualifiers stored in the first participant node;
      (iii) classifying each qualifying event as a command, measurement, or application service request; and
      (iv) dispatching the qualified events to their respective service end points;
   wherein:
   at least one of the events is a non qualifying an unqualified event, and the processing further comprises the steps of:
      (v) the first participant node broadcasting the unqualified event into the IoT network;
      (vi) one or more participant nodes other than the first participant node, attempting to resolve the unqualified event using their respective stored event qualifiers;
      (vii) if the unqualified event is qualified at step (vi), classifying the event as a command, measurement, or application service request, and dispatching the event to its service end point; otherwise, raising an alarm requesting external input from an external system or from a human operator, receiving the external input, and resolving the event based on the external input;
      (viii) changing one or more selected from the group consisting of rules, action maps and knowledge, in response to the resolution of the unqualified event, resulting in new knowledge;
      (ix) broadcasting the new knowledge across the participant nodes, thereby updating the available knowledge within the participant nodes; and
      (x) optimizing the action maps based on the updated knowledge.

2. The computer-implemented method of claim 1, further comprising deploying in real-time or near real-time one or more selected from the group consisting of agents, changed rules, and updated knowledge of the agents, to the participant nodes across the three or more levels of processing.

3. The computer-implemented method of claim 1, wherein the resolution of the events and the broadcasting of the new knowledge take place in real-time or near real-time.

4. The computer-implemented method of claim 1, wherein the qualifying of the events comprises recognition of one or more event patterns.

5. The computer-implemented method of claim 1, further comprising the participant nodes within the three or more levels of processing communicating with an end-user monitoring interface or a notification system.

6. A computer-readable non-transitory storage medium storing executable program instructions for decision support for an Internet of Things (IoT) network operating in an external environment comprising IoT devices, which when executed by a computer cause the IoT network to perform operations comprising:
   (a) retrieving, via one or more edge controllers, inputs from one or more of the IoT devices; and
   (b) processing the inputs with one or more edge controllers, one or more terminal aggregators, and one or more servers organized into three or more levels of processing, wherein each of the one or more edge controllers, each of the one or more terminal aggregators, and each of the one or more servers is a participant node;
   the processing comprising the steps of:
      (i) a first participant node matching the retrieved inputs against currently available knowledge within the first participant node;
      (ii) wrapping the inputs into application level events;
      (iii) attempting to qualify events using event qualifiers stored in the first participant node;
      (iii) classifying each qualifying event as a command, measurement, or application service request; and
      (iv) dispatching the qualified events to their respective service end points;
   wherein:
   at least one of the events is an unqualified event, and the processing further comprises the steps of:
      (v) the first participant node broadcasting the unqualified event into the IoT network;
      (vi) one or more participant nodes other than the first participant node, attempting to resolve the unqualified event using their respective stored event qualifiers;
      (vii) if the unqualified event is qualified at step (vi), classifying the event as a command, measurement, or application service request, and dispatching the event to its service end point; otherwise, raising an alarm requesting external input from an external system or from a human operator, receiving the external input, and resolving the event based on the external input;
      (viii) changing one or more selected from the group consisting of rules, action maps and knowledge, in response to the resolution of the unqualified event, resulting in new knowledge;
(ix) broadcasting the new knowledge across the participant nodes, thereby updating the available knowledge within the participant nodes; and
(x) optimizing the action maps based on the updated knowledge.

7. The computer-readable storage medium of claim 6, further comprising executable program instructions for resolution of the events and the broadcasting of the new knowledge in real-time or near real-time.

8. The computer-readable storage medium of claim 7, further comprising executable program instructions for deploying in real-time or near real-time one or more selected from the group consisting of agents, the rules, and knowledge of the agents to the participant nodes across the three or more levels of processing.

9. The computer-readable storage medium of claim 6, further comprising executable program instructions for storing data selected from the group consisting of programs, rules, action maps and knowledge in one or more of the memories; and for routing the data to a destination in the three or more levels of processing.

10. A decision support system for an Internet of Things (IoT) network, operating in an external environment comprising IoT devices, the support system comprising:
(A) a plurality of edge controllers, a plurality of terminal aggregators, and one or more servers, organized into three or more levels of processing;
the three or more levels of processing being organized in a hierarchy, with each level handling increasingly complex processing,
wherein a first level of processing comprises the plurality of edge controllers, each edge controller being in communication with one or more other edge controllers, and in communication with one or more of the IoT devices;
wherein a second level of processing comprises the plurality of terminal aggregators, each terminal aggregator being in communication with one or more other terminal aggregators and being in communication with and supervising one or more edge controllers,
wherein a third level of processing comprises the one or more servers, each server being in communication with and supervising one or more of the terminal aggregators, and
wherein each of the plurality of edge controllers, each of the plurality of terminal aggregators, and each of the one or more servers is a participant node and comprises a processor and a memory;
(B) communication interfaces between the levels of processing and between the first level of processing and the IoT devices; and
(C) programs, rules, action maps and knowledge, stored in one or more of the memories, wherein each of the programs is executable in a run-time environment by at least one of the processors in the three or more levels of processing;
wherein there is adaptive collaboration among the participant nodes, the adaptive collaboration comprising:
(a) retrieving, via one or more edge controllers, inputs from one or more of the IoT devices; and
(b) processing the inputs with one or more edge controllers, one or more terminal aggregators, and one or more servers;
the processing comprising the steps of:
(i) a first participant node matching the retrieved inputs against currently available knowledge within the first participant node;
(ii) wrapping the inputs into application level events;
(iii) attempting to qualify events using event qualifiers stored in the first participant node;
(iii) classifying each qualifying event as a command, measurement, or application service request; and
(iv) dispatching the qualified events to their respective service end points;
wherein:
at least one of the events is an unqualified event, and the processing further comprises the steps of:
(v) the first participant node broadcasting the unqualified event into the IoT network;
(vi) one or more participant nodes other than the first participant node, attempting to resolve the unqualified event using their respective stored event qualifiers;
(vii) if the unqualified event is qualified at step (vi), classifying the event as a command, measurement, or application service request, and dispatching the event to its service end point; otherwise,
raising an alarm requesting external input from an external system or from a human operator, receiving the external input, and resolving the event based on the external input;
(viii) changing one or more selected from the group consisting of rules, action maps and knowledge, in response to the resolution of the unqualified event, resulting in new knowledge;
(ix) broadcasting the new knowledge across the participant nodes, thereby updating the available knowledge within the participant nodes; and
(x) optimizing the action maps based on the updated knowledge.

11. The system of claim 10, wherein the resolution of the events and the broadcasting of the new knowledge take place in real-time or near real-time.

12. The system of claim 10, wherein:
(a) at least one of the edge controllers is embedded in at least one of the IoT devices, or
(b) at least one of the terminal aggregators is embedded in at least one of the edge controllers, or
(c) at least one of the terminal aggregators is embedded in at least one of the IoT devices.

13. The system of claim 10, wherein each of the three or more levels of processing comprises:
one or more routing buses for routing data; and
a plurality of agents;
wherein one or more selected from the group consisting of the agents, the rules, and the knowledge of the agents move between participant nodes across the three or more levels of processing in real-time or near real-time.

14. The system of claim 10, further comprising one or more selected from the group consisting of:
the external system,
an end-user monitoring interface, and
a notification system;
wherein one or more of the three or more levels of processing communicates with one or more selected from the group consisting of the external system, the end-user monitoring interface, and the notification system.

* * * * *